(12) United States Patent
Monroe et al.

(10) Patent No.: US 11,193,075 B1
(45) Date of Patent: Dec. 7, 2021

(54) FATTY ACID DERIVED ALKYL ETHER FUELS FOR COMPRESSION IGNITION

(71) Applicant: National Technology & Engineering Solutions of Sandia, LLC, Albuquerque, NM (US)

(72) Inventors: Eric Monroe, Pleasanton, CA (US); Joseph Carlson, Castro Valley, CA (US); Ryan Wesley Davis, San Jose, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 16/930,453

(22) Filed: Jul. 16, 2020

(51) Int. Cl.
| | |
|---|---|
| *C10L 1/18* | (2006.01) |
| *C10L 1/185* | (2006.01) |
| *C10L 1/02* | (2006.01) |
| *C10L 10/12* | (2006.01) |
| *F02B 1/12* | (2006.01) |
| *F02B 1/02* | (2006.01) |
| *C10L 10/16* | (2006.01) |

(52) U.S. Cl.
CPC ............... *C10L 1/1852* (2013.01); *C10L 1/02* (2013.01); *C10L 10/12* (2013.01); *C10L 10/16* (2013.01); *F02B 1/02* (2013.01); *F02B 1/12* (2013.01); *C10L 2200/0484* (2013.01)

(58) Field of Classification Search
CPC .......... C10L 1/1852; C10L 1/02; C10L 10/12; C10L 10/16; C10L 2200/0484; F02B 1/12; F02B 1/02
See application file for complete search history.

(56) References Cited

U.S. PATENT DOCUMENTS

| 4,113,662 A | 9/1978 | Wall | |
|---|---|---|---|
| 2020/0017785 A1* | 1/2020 | Kiiski | C10L 1/1616 |

FOREIGN PATENT DOCUMENTS

| WO | WO-2018115574 A1 * | 6/2018 | C10L 10/02 |

OTHER PUBLICATIONS

NIST Chemistry Web Book, Dodecyl isobutyl ether (Year: 0000).*
(Continued)

*Primary Examiner* — Cephia D Toomer
(74) *Attorney, Agent, or Firm* — Medley, Behrens & Lewis, LLC

(57) ABSTRACT

A fuel for an internal combustion engine includes a fatty alkyl ether having a formula corresponding to formula (II):

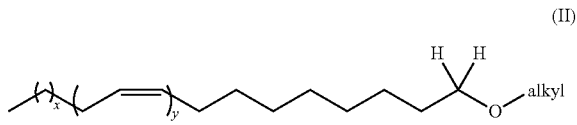

(II)

wherein x is 1-8, and y is 0 to 3; and the alkyl is an alkyl group having a number of carbon atoms that is less than the number of carbon atoms in the alkyl chain on the opposite side of the oxygen atom. The fatty alky ether can be used as a neat fuel or blend with biodiesel, diesel, ethanol or other fuels. The fatty alkyl ethers are improved in cetane number and cold flow properties over a biodiesel with fatty acid methyl acid methyl ester compounds. This is particularly valuable for compression ignition engines. A method of combustion in several types of engines is also disclosed.

20 Claims, 6 Drawing Sheets

(56) References Cited

OTHER PUBLICATIONS

NIST Chemistry Web Book, 1-methoxydecane (Year: 0000).*
ChemSpider.com, (9Z)-1-methoxy-9-octadecene (Year: 0000).*
Elangovan, et al., "Hydrogenation of Esters to Alcohols Catalyzed by Defined Manganese Pincer Complexes", in Angewandte Chemie International Edition, vol. 55, 2016, pp. 15364-15368.
Guilera, et al., "Synthesis of ethyl hexyl ether over acidic ion-exchange resins for cleaner diesel fuel", in the Royal Society of Chemistry, 2013, pp. 1-14.
Huq, et al., "Performance-Advantaged Ether Diesel Bioblendstock Production by a Priori Design", in PNAS, vol. 116, No. 52, Dec. 26, 2019, pp. 26421-26430.
Lee, et al., "Etherification of glycerol by isobutylene. Effects of the density of acidic sites in ion-exchange resin on the distribution of products", in Korean Journal of Chemical Engineering, vol. 28, No. 3, 2011, pp. 756-762.
Ruppert, et al., "Synthesis of Long Alkyl Chain Ethers Through Direct Etherification of Biomass-Based Alcohols With 1-Octene Over Heterogeneous Acid Catalysts", in Journal of Catalysis, vol. 268, 2009, pp. 251-259.
Saudan, et al., "Dihydrogen Reduction of Carboxylic Esters to Alcohols under the Catalysis of Homogeneous Ruthenium Complexes: High Efficiency and Unprecedented Chemoselectivity", in Angewandte Chemie International Edition, 2007, vol. 46, pp. 7473-7476.

* cited by examiner

FATTY ACID DERIVED ALKYL ETHER FUELS FOR COMPRESSION IGNITION

STATEMENT OF GOVERNMENTAL INTEREST

This invention was made with Government support under Contract No. DE-NA0003525 awarded by the United States Department of Energy/National Nuclear Security Administration. The Government has certain rights in the invention.

FIELD

This disclosure relates to fuel and fuel blending agents. More specifically, this disclosure relates to fuel and fuel blending agents for internal combustion engines.

BACKGROUND

Biofuels are increasingly used to supplement conventional petroleum-derived fuels for transportation. As a renewable energy source, biofuels help to reduce dependence on fossil-fuel, mitigate greenhouse-gases emissions, and in some cases, improve air quality. Mandates for biofuels have been established around the world, requiring an even larger increase in biofuel usage in the future.

To support the growing desire to reduce greenhouse gas emissions and establish energy independence, the United States is mandated by federal law to produce 1 billion gallons a year of renewable transportation fuel. While ethanol has emerged as the dominant biofuel for spark-ignition engines, biodiesel emerged as the dominant biofuel for compression ignition engines. Biodiesel has successfully penetrated the transportation fuel market as a renewable supplement to fossil fuel.

Biodiesel is defined as "a fuel comprised of monoalkyl esters of long-chain fatty acids derived from vegetable oils or animal fats, designated B100." Standard Specification for Biodiesel Fuel Blend Stock (B100) for Middle Distillate Fuels. In ASTM D6751-19, 2019. Biodiesel is typically produced using methanol by conversion of triglycerides into fatty acid methyl esters (FAMEs), where the fatty acid profile of the lipid source used will determine the fuel properties. While biodiesel has successfully penetrated the fuel market, with production reaching 2.2 billion gallons in 2016, poor performance in important fuel properties such as cold flow continues to limit the application of large blend volumes in cold weather environments. See Shrestha, D.; Van Gerpen, J.; Thompson, J.; Zawadzki, A. in Cold flow properties of biodiesel and effect of commercial additives, 2005 ASAE Annual Meeting, 2005; American Society of Agricultural and Biological Engineers: 2005; p 1; Monirul, I.; Masjuki, H.; Kalam, M.; Zulkifli, N.; Rashedul, H.; Rashed, M.; Imdadul, H.; Mosarof, M., A comprehensive review on biodiesel cold flow properties and oxidation stability along with their improvement processes, RSC advances 2015, 5, (105), 86631-86655; and Bolonio, D.; Llamas, A.; Rodriguez-Fernandez, J.; Al-Lal, A. M.; Canoira, L.; Lapuerta, M.; Gomez, L., Estimation of cold flow performance and oxidation stability of fatty acid ethyl esters from lipids obtained from *Escherichia coli*. Energy & Fuels 2015, 29, (4), 2493-2502. Cold temperatures cause typical biodiesel fuels to gel and clog fuel filters. These blend volume restrictions must be overcome in order to maximize the potential for bioderived transportation fuels for diesel engines. To more effectively offset the use of fossil-based fuel, year-round blending of renewable fuels without sacrificing performance would be ideal. To address these challenges, efforts have been made to discover new bioderived fuels for diesel engines that have improved fuel properties as compared to FAMEs.

SUMMARY

As disclosed herein, several fatty alkyl ether congeners were synthesized and tested and found to have improved performance in cetane number, lower heating value (LHV) and cold flow properties as compared to a B100 biodiesel comprised of the identical fatty acid profile. Fatty alkyl ethers (FAEs) are almost identical in structure to fatty acid methyl ethers (FAMEs), but in a lower oxidation state. The improved properties make lipid-based long-chain alkyl ethers a possible biodiesel alternative, with particular advantages in cold climate conditions.

In an embodiment, a fuel for an internal combustion engine includes a fatty alkyl ether having a formula corresponding to formula (II):

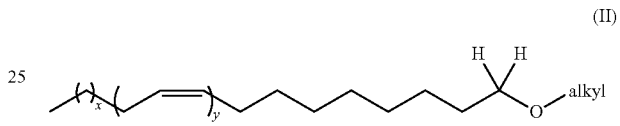

(II)

wherein x is 1-8, and y is 0 to 3; and the alkyl is an alkyl group having a number of carbon atoms that is less than the number of carbon atoms in the alkyl chain on the opposite side of the oxygen atom.

The compounds described herein may be used as neat fuels or mixed fuels (with diesel, biodiesel, marine fuel or other fuel compounds) in compression ignition engines, such as diesel engines or Homogeneous Charge Compression Ignition (HCCI) engines.

In an embodiment, an enhanced fuel for an internal combustion engine includes a majority portion of a fuel selected from the group consisting of: diesel, biofuel, biodiesel, marine fuel, Fischer-Tropsch fuel, or combinations thereof; and a portion of a fatty alkyl ether component.

In an embodiment, a method for powering an internal combustion engine includes the steps of combusting a fuel to drive a piston in a cylinder of the engine.

The term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something and is not intended to indicate a preference.

In an embodiment, a fuel composition consists essentially of the fatty alkyl ether. "Consisting essentially of" in this instance, means the specified materials and those that do not materially affect the basic and novel characteristics of the methods, articles of manufacture, or compositions listed herein. For example, an unspecified material that does not materially affect the basic and novel characteristics of the methods, articles of manufacture, or compositions listed herein, in an amount of less than about 5%, less than about 3%, or less than about 1% may be encompassed by this term.

DETAILED DESCRIPTION

Figure 1:
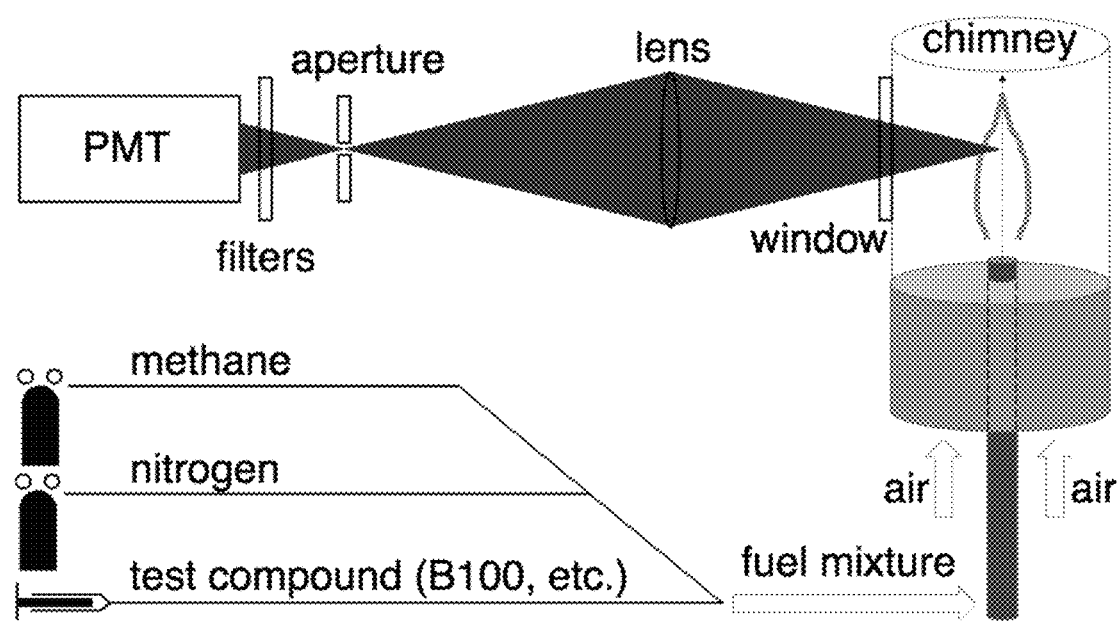
FIG. 1 is a schematic of the experimental apparatus for measuring YSIs as disclosed in Example 8.

Disclosed herein are lipid-based long-chain fatty alkyl ethers (FAEs) that can utilize the same vast domestic renewable vegetable oil (or even animal fat) supplies as FAME biodiesel but has a more reduced oxidation state to improve fuel properties such as cold flow, cetane number, heating value, and soot formation. In addition, a study of the impact of the length and branching of the non-lipid alkyl chain on fuel properties is disclosed herein. This indicates the maximized potential of these molecules for increased blending ratios into petroleum blend stocks (particularly diesel blends) for reduced carbon emissions from the transportation sector.

Formulas (I) and (II) show general structures comparing Fatty Acid Methyl Ester (FAME) biodiesel (I) and the Fatty Alkyl Ether (FAE) congeners (II) disclosed herein.

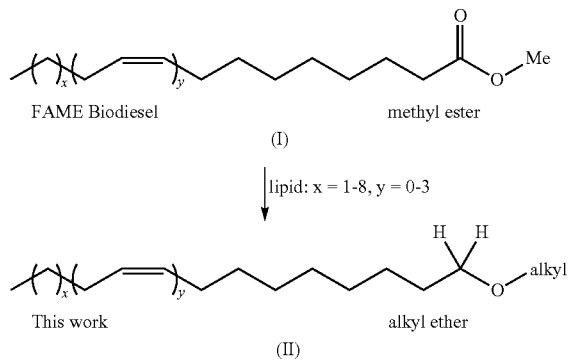

Given that the lipid content of vegetable oils and fats includes a mixture of alkyl chain lengths and unsaturated double bonds, the derived biodiesel is also a mixture of esters as shown in the general formula scheme (I). This makes it difficult to exactly define the fuel properties of biodiesel. The elements of unsaturation in the lipid profile have been shown to correlate with the cetane number and cloud point (CP) of biodiesel. Hoekman, S. K.; Broch, A.; Robbins, C.; Ceniceros, E.; Natarajan, M., Review of biodiesel composition, properties, and specifications. *Renewable and Sustainable Energy Reviews* 2012, 16, (1), 143-169. This adds complication when evaluating new lipid derived fuels in comparison to biodiesel. For this reason, the new fuels described herein are derived from the same batch of B100 biodiesel to achieve a fixed lipid composition that is comparable. In this way, a comparison of the fuel properties is limited to the difference in the terminal functional group, and not the lipid chain profile.

In an embodiment, the FAE has a formula corresponding to formula (II):

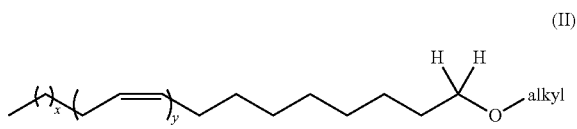

wherein x is 1-8, such as 2 to 6 or 3 to 5, and y is 0 to 3, such as 1 to 2. In an embodiment, the alkyl group contains a number of carbon atoms that is less than the number of carbon atoms in the alkyl chain on the opposite side of the oxygen atom. In an embodiment, the alkyl group includes a C1 to C15 alkyl group, such as a C2 to C8, or C3 to C5 group. In an embodiment, the alkyl group is linear, and, in another embodiment, is branched. In a branched embodiment, the alkyl chain may have 2 to 6 terminal ends, such as 3 to 5, or 4 terminal ends. In a branched embodiment, the alkyl group is selected from the group consisting of: $CH_3$, $CH_2CH_3$, $CH_2CH(CH_3)_2$, $CH_2CH(CH_3)(CH_2CH_3)$, and $CH_2CH_2CH(CH_3)_2$. In a particular embodiment, x is 8 and y is 1.

As a general trend, as shown in the Examples, it was discovered that increasing the length of the alkyl chain improves all the properties investigated, while increased branching increases energy density and lowers cloud point (CP) but decreases cetane number and generates more soot. It was also found that increasing the length of the short straight chained alkyl group decreases the amount of soot formed per kg of fuel. This was surprising and runs against the established trend where increasing oxygen mass % decreases soot formation, even when it was determined that the oxidation state of the compound was unchanged.

An advantage of biofuels are the renewable resources available as starting materials. While the laboratory examples disclosed herein utilize a modified biofuel as a starting material, this is not the most advantageous source (since it is already processed into a useful fuel). Direct synthesis from triglycerides would be more efficient. Sources include vegetable oils and even animal fats. A synthesis compatible with current industrial practices is achievable; for example, through hydrogenous reduction and catalytic acid etherification.

In an embodiment, as disclosed in the examples an alcohol (such as a modified biofuel), or an alcohol derived from a triglyceride (such as from vegetable oil or animal fat) (i.e., through a triglyceride intermediate) can be converted to a fatty alkyl ether by mixing: an alkyl halide corresponding to the alkyl group of formula II with the alcohol in the presence of a nucleophilic catalyst, such as KI, in non-polar solvent, such as THF. Cooling, such as down to 0° C. in an ice bath may be preferable. A base, such as an alkali halide, e.g., NaH dispersed in a non-polar material such as mineral oil may also be metered to the reaction mixture over 20 minutes. After addition of the alkyl halide, the reaction mixture can be brought to reflux for several hours, e.g., 2 to 48, or 10 to 32, or 12 to 20 hours. Progress of the reaction can be monitored through TLC and GCMS, after consumption of the alcohol the reaction can be cooled again, down to 0° C. The reaction can then be quenched (e.g., by slow metered addition of water), and the product extracted, (e.g., with hexanes), and washed (e.g., with a salt solution). The product can be dried, filtered, and concentrated in vacuo. Purification can then be performed by known methods.

In an embodiment, the FAE compounds can be made by catalytic dehydration or Williamson ether synthesis. However, these methods have limitations on making asymmetric or hindered ethers. Electrochemical and catalytic Mitsunobu methodologies are also available for making ethers. In an embodiment, the FAE compounds can be made from triglycerides by hydrogenation and acid catalyzed alkylation. These routes may be particularly favorable for scaling-up the synthesis.

In an embodiment, the hydrogenation of triglycerides can be performed with ruthenium, manganese, or nickel copper hydrogenation reactions to form an alcohol. Also, a Bouvault-Blanc reduction reaction can be used to form alcohols. Following a biphasic separation, the resulting alcohols can be etherified by an acid catalyzed alkylation reaction with an acidic ion exchange resin such as Amberlyst 15 to form a product after distillation and/or separation.

The data herein indicates the FAE compounds may be superior to biodiesel because of certain properties. The branched FAE may be particularly useful in diesel or other compression ignition engines and especially in cold climates.

The Examples below show that increasing the carbon chain length (in particularly of the short alkyl chain group) generally improved all properties investigated, while branching led to significant improvements in cold flow, minor improvements in energy density, and slightly worse performance in cetane number and sooting tendency. All FAEs investigated showed improvements in DCN, LHV, sooting and cold flow as compared to a B100 control fuel. Certain branched compounds showed improvements over linear congeners in DCN, LHV and cloud point. These results demonstrate the potential for FAEs to be used in high blend volumes of diesel for use as all-weather fuels, while also reducing soot emissions and increasing engine performance and fuel economy as compared to traditional biodiesel. Cloud point (CP) is a metric for evaluating the cold flow-properties of diesel fuels. Pour point (PP) and cold filter plug point (CFPP) are two other properties that are also important to consider.

In an embodiment, the FAE compound has a derived cetane number (DCN) of 63 to 120, such as, for example, 65 to 110, or 80 to 100. This is contrasted to the DCN of B100 Biodiesel (comprising FAME compounds having the same fatty acid chain as the FAE) of 62.6 (see FIG. 5).

In an embodiment, the FAE compound has a Cloud Point −2 to −20° C., such as −5 to −16° C., or −6 to −12° C. This is contrasted to the cloud point of B100 Biodiesel (comprising FAME compounds having the same fatty acid chain as the FAE compound) of about −1° C. (see FIG. 5).

In an embodiment, the FAE compound has an LHV of 37.5 to 45 MJ/kg, such as, for example, 39 to 41.8 MJ/kg, or 39.5 to 41.2 MJ/kg. This is contrasted to the LHV of B100 Biodiesel (comprising FAME compounds having the same fatty acid chain as the FAE) of 37.1 MJ/kg (see FIG. 5).

In an embodiment, the FAE compound has a % change in soot/MJ compared to #2 diesel of −47.5% to −55%, such as, for example, −48% to −51%, or 49% to 50.5%. This is contrasted to the % change in sort/MJ of B100 Biodiesel (comprising FAME compounds having the same fatty acid chain as the FAE) of −47% (see FIG. 5).

In an embodiment, the FAE compound has a Cold Filter Plug Point (CFPP) of −2 to −20° C., such as, for example, −4 to −18° C., or −8 to −14° C.

The examples disclosed herein indicate the compounds disclosed herein have improvements across multiple measured properties.

The examples herein are performed with neat examples of the FAE compounds; however, the results indicate that the FAE compounds can also be used as blending agents in traditional fuels in internal combustion engines.

In an embodiment, a fuel blend comprises a portion of an FAE and a portion of a fuel selected from the group consisting of: biofuel, diesel fuel, biodiesel, marine fuel, Fischer Tropsch fuel or combinations thereof.

In an embodiment, the FAE component comprises 51% to 99.9% of the total fuel by liquid volume, such as, for example, 60% to 98%, or 80% to 95%, and the minority portion of the fuel is a fuel selected from those listed herein, for example, 5% to 0.01%, 20% to 5%, or 40% to 10% of the total fuel by liquid volume. In an embodiment, the majority portion FAE is present with the minority fuel in a volume ratio of 99.9:0.1 to 51:49, 95:5 to 70:30, or 90:10 to 60:40.

In an embodiment, the majority portion fuel comprises 51% to 99.9% of the total fuel by liquid volume, such as, for example, 60% to 98%, or 80% to 95%, and the minority portion of the fuel is the FAE, for example, 5% to 0.01%, 20% to 5%, or 40% to 10% of the total fuel by liquid volume. In an embodiment, the majority portion fuel is present with the FAE component in a volume ratio 99.9:0.1 to 51:49, 95:5 to 70:30, or 90:10 to 60:40.

In an embodiment, low-cost, low-octane fuels may have their DCN raised with the FAE blending agent, so that the DCN of the blend is increased to a level that is advantageous in conventional commercial vehicles. In an embodiment, the FAE compounds may also be used as a blending agent in fuels with lower DCN, such as currently available pump diesel fuels to create a fuel with a DCN above current levels for diesel. From the trends shown in the examples section, it is expected that the DCN of the fuel blend can be raised, for example, 5% to 80% higher, such as 10% to 50%, or 15% to 30%, higher than the CN of the majority portion of the fuel.

The blending of the gasoline, diesel, or alcohol fuel and the FAE compound can be performed at the pump, for example, as a blending agent blended into the fuel in the underground containers at the filling station. In another example, two separate tanks at the filling station would be filled. One with majority portion fuel, e.g. gasoline or diesel, and one with the FAE compound, and they would come together and be mixed in the pump, as the vehicle is fueled. The blending agent can also be added directly to the gas tank of a vehicle that is separately filled with fuel. It could also be blended at the supplier just prior to shipment to the filling station. In any of these manners the fuel blend could be changed depending on the climate/temperature of the season and filling location.

A method for powering an internal combustion engine includes combusting a fuel to drive a piston in a cylinder of the engine. The fuel comprises an FAE compound selected from those disclosed herein or blends thereof. In an embodiment, the FAE compound is all or a majority portion of the total fuel used in the engine, particularly in compression ignition engines.

In an embodiment, the FAE compound compression ignition engines, such as diesel engines or Homogeneous Charge Compression Ignition (HCCI) engines. These engines are known in the art and do need description in detail to those of ordinary skill in the art.

A section including working examples follows, but, as with the rest of the detailed description, should not be read to be limiting on the scope of the claims.

EXAMPLES

Unless otherwise noted, all reactions were carried out in oven-dried glassware sealed with rubber septa under argon atmosphere with Teflon-coated magnetic stir bars. All reagents were purchased from Sigma Aldrich or Alfa Aesar and were used without further purification unless otherwise stated. All reactions were monitored by TLC, GCMS or NMR analysis. Visualization of analytical thin-layer chromatography was accomplished with UV (254 nm) and potassium permanganate (KMnO4) as a staining solution.

Control Example 1

Soy-derived B100 biodiesel fuel was acquired from Louis Dreyfus Agricultural Industries, LLC (batch #20368), and used as received with properties and composition detailed by Fioroni et al., Screening of potential biomass-derived streams as fuel blendstocks for mixing controlled compression ignition combustion. SAE International Journal of Advances and Current Practices in Mobility 2019, 1, (2019-01-0570), 1117-1138. This control example 1 material was used as both a control and the starting material. The fatty acid profile for control Example 1 is shown in Table 1.

TABLE 1

| Components of Control Example 1 | | | | | | | | |
|---|---|---|---|---|---|---|---|---|
| Fatty Acids | Myristic | Palmitic | Palmitoleic | Stearic | Oleic | Linoleic | Linolenic | Arachidic | Other |
| $C_{total}$: Unsaturation | 14:00 | 16:00 | 16:01 | 18:00 | 18:01 | 18:02 | 18:03 | 20:00 | |
| Composition$^a$ (% w/w) | 0.07 | 10.84 | 0.27 | 4.52 | 23.21 | 52.73 | 7.34 | 0.41 | 0.61 |

$^a$Normalized mass fractions are values based on GCMS analysis of the B100 blend.

Example 1

Preparation of B100 Derived Alcohol

A 2 L round bottom flask was charged with lithium aluminum hydride (LAH) (28.2 g, 0.742 mol, 1.1 equiv.) and diethyl ether (Et2O)(1,350 mL), then cooled to 0° C. with an ice bath. To this mixture, with rapid stirring, B100 (200.0 g, 0.675 mol, 1.0 equiv.) was added dropwise via addition funnel. The cooling bath was removed, and the mixture was stirred for 2 hours. Once starting material was consumed as determined by TLC and GCMS, the reaction was cooled to 0° C. and diluted with ethyl acetate (EtOAc) (50 mL) and quenched via slow, sequential addition of H2O (28 mL), 10% NaOH (28 mL), and H2O (84 mL) while stirred at room temperature for 1 hour. To this mixture, anhydrous MgSO4 was added and stirred for an additional 1 hour. The reaction was filtered, and the resulting yellow oil was purified by bulb-to-bulb distillation (181-189° C., 1.30 Torr) to produce the modified biofuel as a colorless oil (163 g, 91%).

Example 2

General Procedure for Ether Synthesis (FAE 1-5)

A 500-mL round bottom flask was charged with B100 derived alcohol (1 equiv.), KI (0.1 equiv.) and THF, then cooled to 0° C. with an ice bath. To this mixture, 60% NaH dispersion in mineral oil (1.2-1.5 equiv.) was added portionwise over 20 min and stirred for 10 minutes. The alkyl halide (1.3-2.0 equiv.) corresponding to the short chain end of the FAE was added via syringe and the reaction mixture was brought to reflux for 16 hours. Once the modified biofuel from Example 1 was consumed as determined by TLC and GCMS, the reaction was cooled to 0° C. and quenched via slow addition of H2O (50 mL), extracted with hexanes (2×50 mL), washed with saturated NaCl solution (50 mL), dried using anhydrous MgSO4, filtered, and concentrated in vacuo. The crude reaction mixture was purified via distillation as shown in Examples 3-7 below. All reported yields were unoptimized.

The reaction scheme of Examples 1 and 2 is shown below in formula scheme (III). The dotted bond line represents the bond between the R group and the 0 atom.

(III)

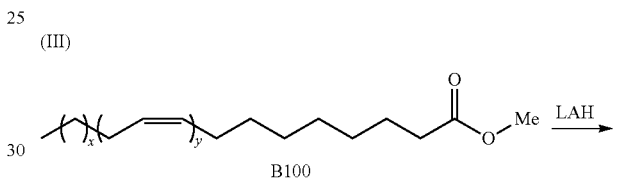

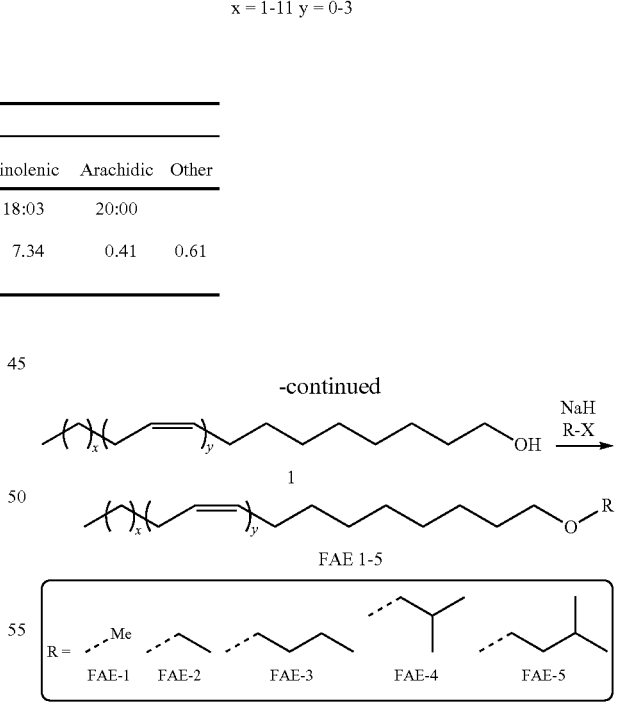

Example 3

Compound FAE-1: Bulb-to-bulb distillation per Example 2 under reduced pressure (390 mTorr, 107-120° C.) yielded Example 3 (80.1 g, 83%) as a colorless oil. 1H NMR (500 MHz, CDCl3) δ 5.38-5.26 (m, 2.6H), 3.33 (t, J=6.7 Hz, 2H), 3.29 (s, 3H), 2.74 (t, J=6.8 Hz, 1H), 2.05-1.96 (m, 3H), 1.57-1.50 (m, 2H), 1.35-1.20 (m, 19H), 0.86 (q, J=6.4 Hz, 3H).

Example 4

Compound FAE-2: Bulb-to-bulb distillation per Example 2 under reduced pressure (400 mTorr, 114-126° C.) yielded Example 4 (56.0 g, 84%) as a colorless oil. 1H NMR (500 MHz, CDCl3) δ 5.38-5.26 (m, 2.6H), 3.46 (q, J=7.0 Hz, 2H), 3.39 (t, J=6.8 Hz, 2H), 2.77 (t, J=6.4 Hz, 1H), 2.07-1.98 (m, 3H), 1.59-1.53 (m, 2H), 1.37-1.23 (m, 19H), 1.19 (t, J=7.0 Hz, 3H), 1.90-0.86 (m, 3H).

Example 5

Compound FAE-3: Bulb-to-bulb distillation under reduced pressure (400 mTorr, 114-126° C.) yielded Example 5 (56.0 g, 84%) as a colorless oil. 1H NMR (500 MHz, CDCl3) δ 5.38-5.26 (m, 2.6H), 3.39 (q, J=6.7 Hz, 4H), 2.77 (t, J=6.8 Hz, 1H), 2.07-1.98 (m, 3H), 1.58-1.51 (m, 4H), 1.39-1.25 (m, 21H), 0.92 (t, J=7.4 Hz, 3H), 0.89-0.86 (m, 3H).

Example 6

Compound FAE-4: Bulb-to-bulb distillation under reduced pressure (1.20 Torr, 136-153° C.) yielded Example 6 (33.2 g, 45%) as a pale-yellow oil. 1H NMR (500 MHz, CDCl3) δ 5.40-5.28 (m, 2.6H), 3.39 (t, J=6.5 Hz, 2H), 3.16 (d, J=6.7 Hz, 2H), 2.77 (t, J=6.5 Hz, 1H), 2.07-1.98 (m, 3H), 1.85 (septet, J=6.7 Hz, 1H), 1.57-1.50 (m, 2H), 1.35-1.20 (m, 19H), 0.90 (d, J=6.8 Hz, 6H), 0.86 (q, J=6.0 Hz, 3H).

Example 7

Compound FAE-5: Bulb-to-bulb distillation under reduced pressure (390 mTorr, 129-149° C.) yielded Example 7 (40.0 g, 66%) as a colorless oil. 1H NMR (500 MHz, CDCl3) δ 5.40-5.28 (m, 2.6H), 3.42 (t, J=6.5 Hz, 2H), 3.38 (t, J=6.7 Hz, 2H), 2.77 (t, J=6.5 Hz, 1H), 2.07-1.98 (m, 3H), 1.69 (septet, J=6.7 Hz, 1H), 1.57-1.50 (m, 2H), 1.46 (q, J=6.8 Hz, 2H), 1.35-1.20 (m, 19H), 0.90 (d, J=6.6 Hz, 6H), 0.86 (q, J=6.0 Hz, 3H).

Examples 8-10 and Comparative Examples 1-3

Fuel Property Testing

Fuel properties of the various molecules investigated in this study were tested following ASTM protocols. Derived Cetane Number (DCN) was determined by Ignition Quality Test (IQT) according to ASTM D6890 protocol (ASTM-D6890-16e1, 2016), and No-Flow Point according to ASTM D7346 protocol (ASTM-D7346-15, 2015). Cloud Point (CP) was determined according to ASTM D2500 protocol (ASTM-D2500-17a, 2017). Higher Heating Value (HHV) was determined by ASTM D240 protocol (ASTM-D240-19, 2019) except for FAE-1, which was determined by D240 protocol (ASTM-D240-19, 2019). The Lower Heating Value (LHV) was calculated based on the higher heating value using the equation developed by Lloyd (referenced in ASTM D240 method) which is shown below as Equation 1. See Lloyd, W. G.; Davenport, D. A., Applying thermodynamics to fossil fuels: Heats of combustion from elemental compositions. Journal of Chemical Education 1980, 57, (1), 56.

$$LHV[MJ/kg] = HHV[MJ/kg] - (0.2122 \times \text{hydrogen}[\text{mass }\%]) \tag{1}$$

The cold filter plugging point (CFPP) is the lowest temperature at which a given volume of pure biodiesel (B100) still passes through a standardized filter within 60 seconds and can be measured by ASTM D6371 (ASTM-D6371-17a, 2017).

Example 8

Comparison of Fatty Chain Molecules with Ester, Alcohol, and Ether

To better understand the fuel properties of the FAEs, three non-traditional oxidation states of molecules with fatty chains (acetate, alcohol, ester, and ethers) were investigated (Comparative Examples 1-3 and FAE-2). For each compound other than the alcohol (which does not have an alkyl ether carbon chain), a two carbon ethyl group was used for carbon number parity across the molecular classes with the exception of FA alcohol, which by definition only has an H atom on the side opposite the fatty carbon chain.

Fatty Acid Alcohol

Comparative Example 1

A 2 L round bottom flask was charged with LAH (28.2 g, 0.742 mol, 1.1 equiv.) and Et2O (1,350 mL), then cooled to 0° C. with an ice bath. To this mixture, with rapid stirring, B100 (200.0 g, 0.675 mol, 1.0 equiv.) was added dropwise via addition funnel. The cooling bath was removed and the mixture was stirred for 2 hours. Once starting material was consumed as determined by TLC and GCMS, the reaction was cooled to 0° C. and diluted with EtOAc (50 mL) and quenched via slow, sequential addition of water (28 mL), 10% NaOH (28 mL), and H2O (84 mL) which stirred at room temperature for 1 hour. To this mixture, anhydrous MgSO4 was added and stirred for an additional 1 hour. The mixture was filtered, and the resulting yellow oil was purified by bulb to bulb distillation (181-189° C., 1.30 Torr) to provide FA alcohol as a colorless oil (163 g, 91%).

Fatty Acid Ethyl Ester

Comparative Example 2

A 1 L round bottom flask was charged with B100 (80.0 grams, 0.270 mol), anhydrous ethanol (160 mL, 2.70 mol) and concentrated H2SO4 (2 mL). The mixture was refluxed for 12 hours. The mixture was cooled and water was added (100 mL) followed by hexanes (100 mL). The biphasic mixture was separated and the organic layer was washed with saturated aqueous $NaHCO_3$ (50 mL) then brine (50 mL). The mixture was dried with MgSO4 and concentrated in vacuo to provide fatty acid ethyl ester as a clear, slightly yellow oil (67.0 grams, 80% yield). 1H NMR (500 MHz, CDCl3) had the following characteristics: δ 5.45-5.25 (m, 3.1H), 4.12 (q, J=7.1 Hz, 2H), 2.77 (t, J=6.7 Hz, 1.4H), 2.28 (t, J=7.6 Hz, 2H), 2.07-1.99 (m, 4H), 1.63 (m, 3H), 1.43-1.16 (m, 22H), 0.88 (td, J=6.7, 4.6 Hz, 3H).

Fatty Acid Acetate

Comparative Example 3

A 500 mL round bottom flask was charged with a fatty acid alcohol (60.0 grams, 0.225 mol), pyridine (21.8 mL, 1.2 equiv) and DCM (250 mL). The mixture was cooled with an ice bath followed by the addition of acetyl chloride (19.3 mL, 1.2 equiv). The mixture was allowed to warm to room temperature and stirred for 4 hours. Water (250 mL) was added, the biphasic mixture was separated and the aqueous phase was washed with hexanes (3×50 mL). The combined organics were washed with water (40 mL) and brine (40 mL), then dried with MgSO4 and concentrated in vacuo to provide B100 acetate (41.0 grams, 59% yield) as yellow oil. 1H NMR (500 MHz, CDCl3) had the following characteristics: δ 5.44-5.27 (m, 2.8H), 4.05 (t, J=6.8 Hz, 2H), 2.77 (t, J=6.7 Hz, 1.3H), 2.04 (m, 6H), 1.61 (t, J=7.1 Hz, 2H), 1.42-1.19 (m, 19H), 0.88 (td, J=6.9, 4.9 Hz, 3H).

Figure 2:
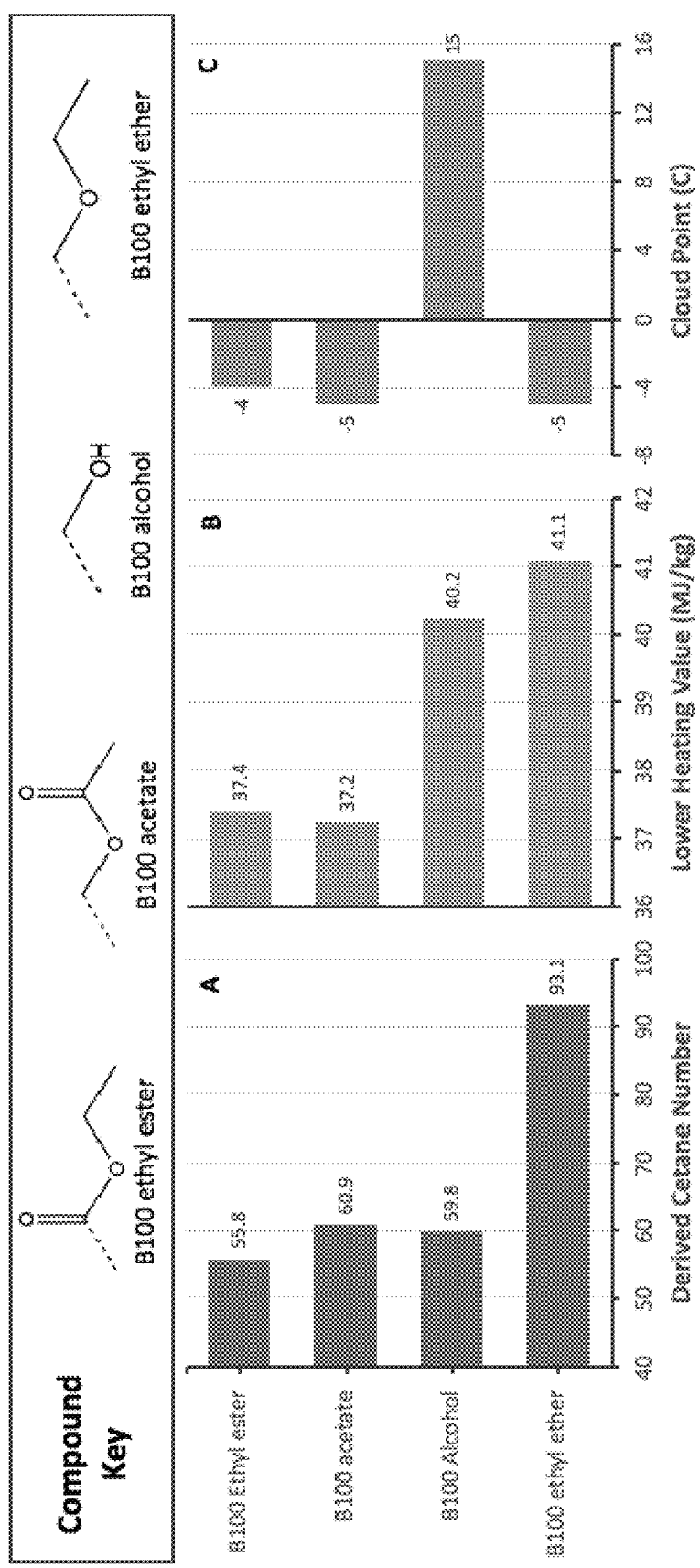
FIG. 2 is a series of charts showing the effect of oxidation state on fuel properties: (a) Derived Cetane Number (DCN), (b) Lower Heating Value (LHV), (c) and Cloud Point (CP).

FIG. 2 shows a comparison of the DCN, LHV, and cloud point of the B100-based ethyl ester, acetate, alcohol, and ethyl ether compounds. B100 alcohol had moderate DCN and LHV, but a prohibitively high CP. The ethyl ester and acetate ester had similar properties, with the acetate ester demonstrating higher DCN and CP. Within the series, B100 ethyl ether demonstrated a DCN of 93.1, an improvement of 30.5 cetane number over B100 control fuel. The ethyl ether also had the highest performing LHV and the lowest CP in the series, suggesting that ether functional groups were promising candidates as fatty acid based fuels for all-weather compression ignition engines.

Example 9

Yield Soot Index

Soot formation is another fuel property to consider when evaluating biofuel candidates for compression ignition engines. One benefit of oxygenated fuels is their ability to reduce soot formation when blended into traditional diesel base fuels due to their lack of aromatic constituents and the molecular oxygen being able to sequester carbon atoms as CO/CO2. This can lead to cost reductions for the aftertreatment systems used on heavy duty engines.

The sooting tendencies of the B100 ethers and other related compounds were measured using the previously developed yield-based approach. McEnally, C. S.; Pfefferle, L. D., Improved sooting tendency measurements for aromatic hydrocarbons and their implications for naphthalene formation pathways. Combustion and Flame 2007, 148, (4), 210-222. The specific procedures and apparatus used in this Example were identical to those disclosed in McEnally, C. S.; Xuan, Y.; John, P. C. S.; Das, D. D.; Jain, A.; Kim, S.; Kwan, T. A.; Tan, L. K.; Zhu, J.; Pfefferle, L. D., Sooting tendencies of co-optima test gasolines and their surrogates. Proceedings of the Combustion Institute 2019, 37, (1), 961-968. The apparatus is disclosed in FIG. 1. The procedure consisted of three steps: (1) sequentially doping 1000 ppm of n-heptane, toluene, and each test compound into the fuel of a nitrogen-diluted methane flame; (2) measuring the maximum soot concentration in each flame with line-of-sight spectral radiance (LSSR); and (3) rescaling the signals into a yield sooting index (YSI) defined by Equation 2:

$$YSI_{TC} = (YSI_{TOL} - YSI_{HEP}) \times \frac{LSSR_{TC} - LSSR_{HEP}}{LSSR_{TOL} - LSSR_{HEP}} + YSL_{HEP} \quad (2)$$

The subscripts TC, TOL, and HEP refer to the test compound toluene, and n-heptane, respectively. This rescaling method factors-out sources of systematic uncertainty such as errors in the gas-phase reactant flow rates. Furthermore, it allows the new results to be quantitatively compared with a database26 that contains measured YSIs for hundreds of organic compounds. The parameters YSITOL and YSI-HEP are constants that define the YSI scale; their values—170.9 and 36.0—were taken from the database so that the newly measured YSIs would be on the same scale. Isooctane was used as an internal standard and measured 12 times during this study. Its measured values were consistent over time with a random uncertainty of 5.0% (2 standard deviations). The average value (63.2) agrees with earlier studies. The metrics of YSI/kg and YSI/MJ are determined by dividing the measured YSI by the molecular weight of the fuel and multiplying by 1000 and dividing the YSI by the lower heating value respectively.

Figure 3:
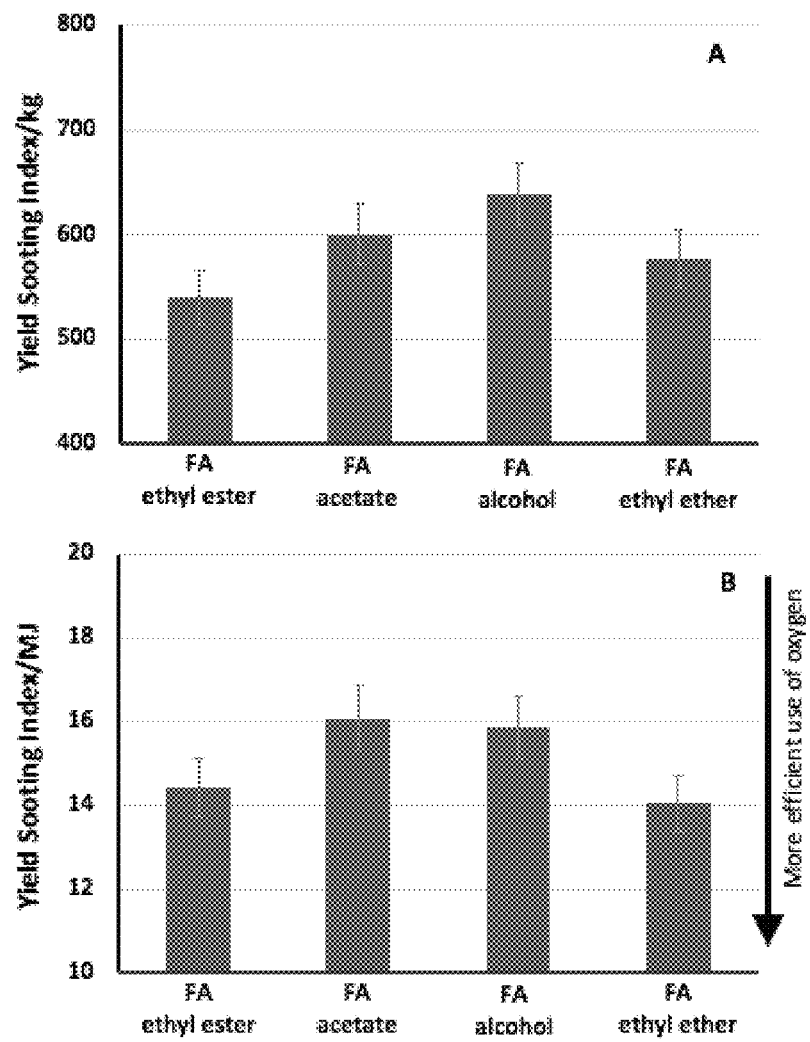
FIG. 3 is graph comparing the YSI of the B100-derived ethyl ester, ethyl acetate, alcohol, and ethyl ether oxidation states as a ratio based on mass (triangles, left axis) and LHV (diamonds, right axis).

FIG. 3 shows an evaluation of the YSI of the B100-derived ethyl ester, ethyl acetate, alcohol, and ethyl ether oxidation states as a ratio based on mass (panel A) and LHV (panel B). While sooting tendencies generally correlate to the mass percent of oxygen, where increasing the oxygen mass percent decreases the amount of soot formed, the sooting performance of oxygenated biofuels has a more complex character unaccounted for by just C:O ratio or oxygen mass %. As shown in FIG. 3, B100 ethyl ester and B100 acetate have the same molecular formula and oxygen mass fraction of 10.3%, yet B100 acetate forms significantly more soot/kg than B100 ethyl ester.

Figure 4:
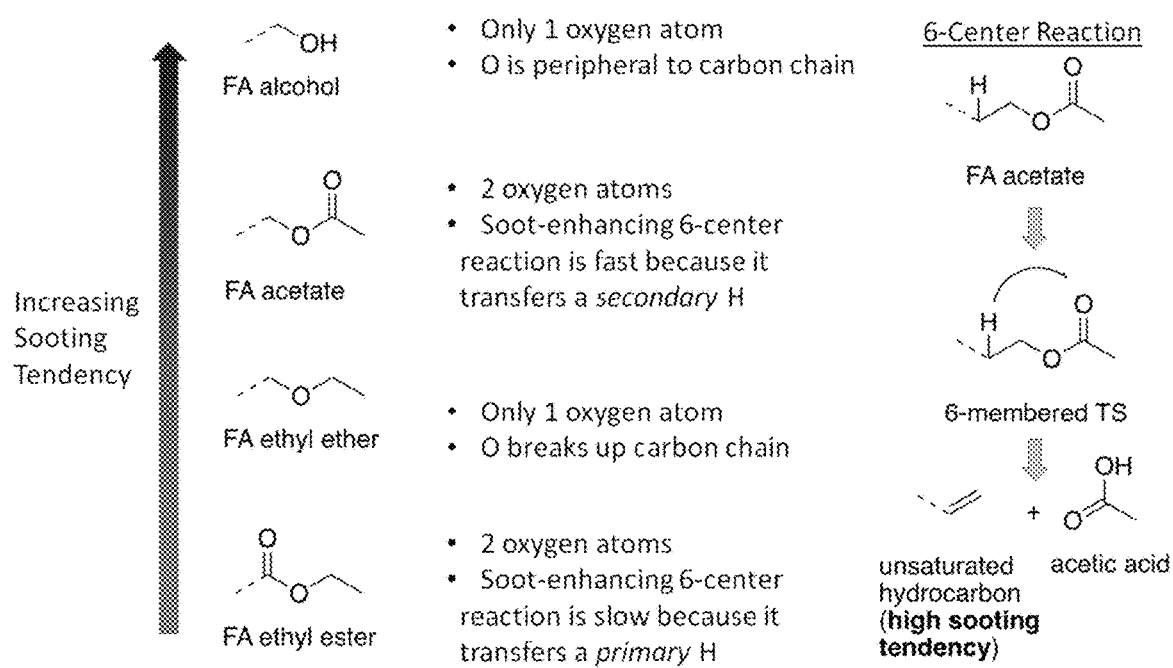
FIG. 4 is a graphic showing potential soot formation pathways for the different oxidation states investigated in the Examples.

Additionally, B100 ethyl ether has a lower oxygen mass percent than both B100 acetate and B100 alcohol yet forms less soot per kg. A likely explanation is that for B100 ether the oxygen breaks up the carbon chain whereas for B100 alcohol the oxygen atom is peripheral to the chain and B100 acetate allows six-membered eliminations reactions that produce large unsaturated hydrocarbons. See FIG. 4. McEnally, C. S.; Pfefferle, L. D., Sooting tendencies of oxygenated hydrocarbons in laboratory-scale flames. Environmental science & technology 2011, 45, (6), 2498-2503. McEnally, C. S.; Pfefferle, L. D., Fuel decomposition and hydrocarbon growth processes for oxygenated hydrocarbons: butyl alcohols. Proceedings of the Combustion Institute 2005, 30, (1), 1363-1370, incorporated herein by reference.

These results show that the specific oxygen functionality has an important impact on soot formation. Since increasing oxygen content and thereby decreasing C:O ratio has a well-established negative impact on a fuel's LHV, finding the most efficient form of oxygen containing functionality is highly significant. When considered as a ratio of soot formation to energy density, B100 ethyl ether is the strongest performer and demonstrates the most efficient use of molecular oxygen when considering the soot formation/energy density tradeoff.

Based on the strong performance of B100 ethyl ether described above, the broader class of molecules herein described as Fatty Alkyl Ethers (FAEs), was investigated further by determining the impact varying the shorter alkyl chain has on the fuel properties of interest. C1-C5 straight and branched carbon chains were selected because these structures can be derived sustainably from biomass at industrial scales in the form of alcohols.

Example 10

Evaluation of FAEs 1-5 (Examples 3-7)

Figure 5:
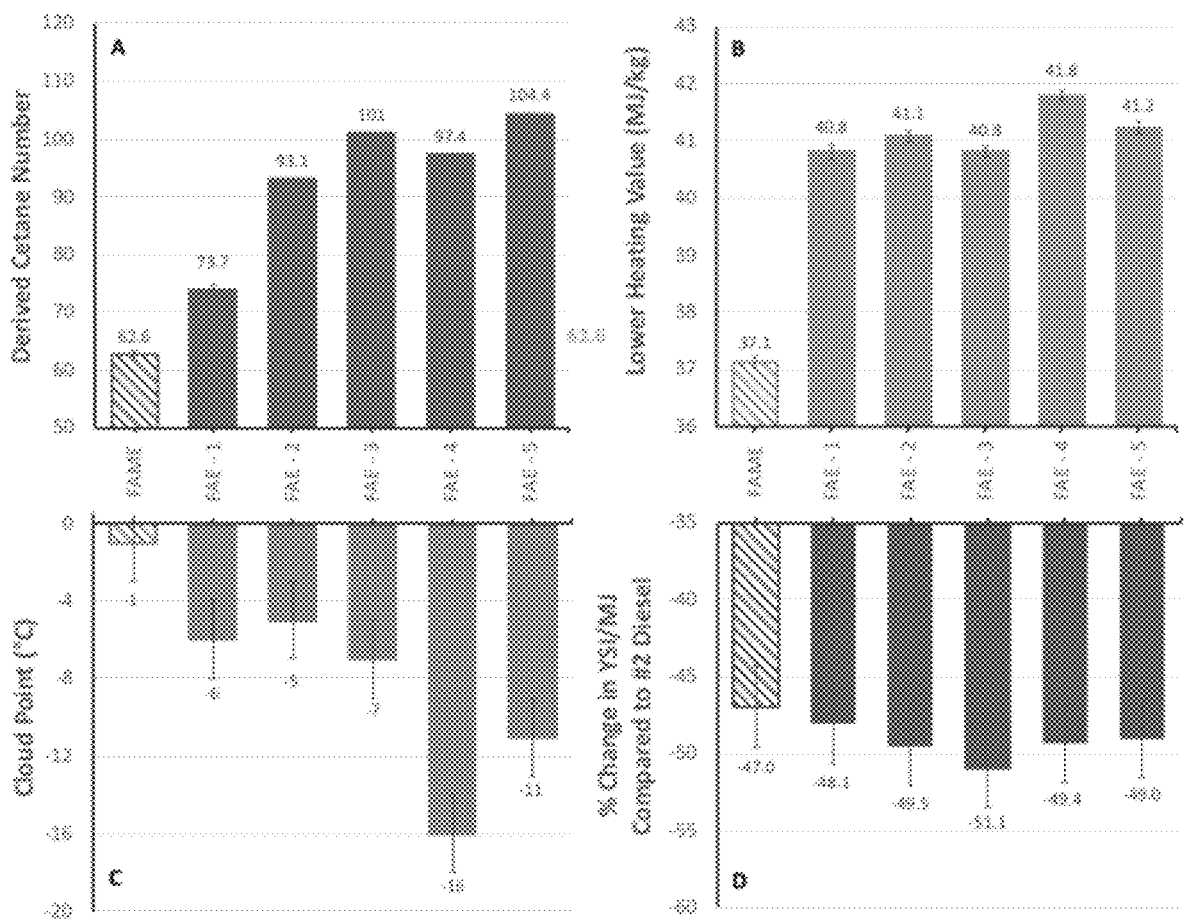
FIG. 5 is a graph showing (FAE) derivatives and the properties: (a) Derived Cetane Number (DCN), (b) Lower Heating Value (LHV), (c) Cloud Point (CP), and (d) reduction in soot/MJ compared to diesel fuel.

Further investigation of specific FAEs synthesized in Examples 3-7 having alkyl chains of C1-C5 straight and branched structure was undertaken. FIG. 5 shows Examples 3-7 evaluated and compared for fuel properties: (a) Derived Cetane Number (DCN), (b) Lower Heating Value (LHV), (c) Cloud Point (CP), and (d) reduction in soot/MJ compared to diesel fuel.

As shown in FIG. 5, the longer length of the alkyl chain improves all the properties investigated, while increased branching increases energy density and lowers cloud point (CP) but decreases cetane number and generates more soot.

A surprising phenomenon was observed within the series FAE 1-3 (Examples 3-5). In this series, increasing the length of the short straight chained alkyl group decreased the amount of soot formed per kg of fuel. This breaks the established trend where increasing oxygen mass % decreases soot formation.

With respect to the branched FAEs 4 and 5 (Examples 6 and 7), a gain in DCN, LHV and cloud point were achieved over the linear congeners. The improvement is most evident by comparison of the four carbon isomers FAE 3 and FAE 4, which show that a single element of branching on the alkyl group can provide a ΔTcp of −9° C. These improvements came at the expense of some performance in sooting.

It is notable that all of the FAE compounds offer an improvement over the B100 feedstock in every fuel property measured, the greatest benefit seen in FAE 5 with a DCN=104.4, an improvement of 41.8 cetane number over the B100 control fuel.

B100 methyl ether has a lower cloud point (CP), but higher pour point and cold filter plugging point.

Figure 6:
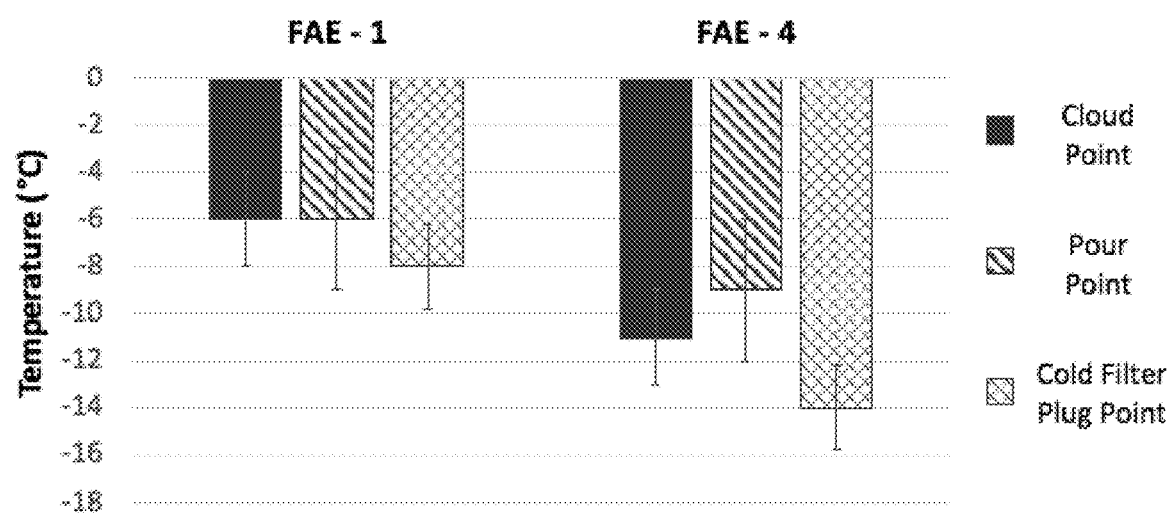
FIG. 6 is a graph comparing cold flow properties of FAEs having the alkyl groups methyl ether and isoamyl ether.

FIG. 6 shows a comparison of the three different cold flow properties between methyl ether FAE 1 and FAE 4 highlighting some differences between the types of cold flow. (Error bars represent the stated repeatability of the measurements outlined in the ASTM methods.) While in each case the measured value of FAE 4 was lower than that of FAE 1, the level of improvement varied across the different tests. The improvement in PP was not outside the repeatability of measurement, while both CP and CFPP saw significant improvements.

These results demonstrate the potential for fatty alkyl ethers for use as all-weather fuels, while also reducing soot emissions and increasing engine performance and fuel economy as compared to traditional biodiesel. Of all the cold flow properties, the CFPP was improved the most from FAE 1 to FAE 5, with a decrease of 6° C. observed. This is an important result since some analyses suggest that CFPP may be the most notable property for engine performance. The CFPP suggests that FAE's may have even better cold flow improvements over Fatty Acid Methyl Esters than suggested from the cloud point data.

In summary, after an initial survey of various terminal functional groups derived from fatty acids as compression ignition engine fuels, it was evident that alkyl ethers possessed benefits over esters and alcohols in all fuel property categories. Within the initial series of varying terminal groups, a surprising sooting phenomenon was observed where an ether possessing less oxygen than an acetate congener will emit less soot: a reversal in a common trend due to the intramolecular nature of the mechanism on soot formation.

All patents, patent applications, publications, technical and/or scholarly articles, and other references cited or referred to herein are in their entirety incorporated herein by reference to the extent allowed by law. The discussion of those references is intended merely to summarize the assertions made therein. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved.

In the description above, for the purposes of explanation, numerous specific details have been set forth in order to provide a thorough understanding of the embodiments. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. The term "consisting essentially" as used herein means the specified materials or steps and those that do not materially affect the basic and novel characteristics of the material or method. Unless the context indicates otherwise, all percentages and averages are by weight. If not specified above, the properties mentioned herein may be determined by applicable ASTM standards, or if an ASTM standard does not exist for the property, the most commonly used standard known by those of skill in the art may be used. The articles "a," "an," and "the," should be interpreted to mean "one or more" unless the context indicates the contrary.

What is claimed is:

1. A fuel for an internal combustion engine comprising: a fatty alkyl ether having a formula corresponding to formula (II):

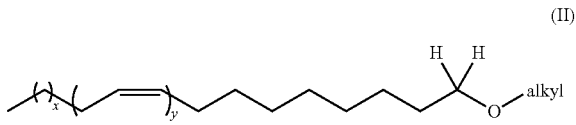

(II)

wherein x is 1-8, and y is 1 to 3; and
the alkyl is a branched alkyl group having a number of carbon atoms that is less than the number of carbon atoms in the alkyl chain on the opposite side of the oxygen atom.

2. The fuel of claim 1, wherein the alkyl group is a C8 to C15 alkyl group.

3. The fuel of claim 1, wherein the alkyl group is a C3 to C8 alkyl group.

4. The fuel of claim 1, wherein the alkyl group is selected from the group consisting of: $CH_2CH(CH_3)_2$, $CH_2CH(CH_3)(CH_2CH_3)$, and $CH_2CH_2CH(CH_3)_2$.

5. The fuel of claim 1, wherein fatty alkyl ether has a Cold Filter Plug Point (CFPP) of −2 to −20° C.

6. The fuel of claim 1, wherein the fatty alkyl ether has an LHV of 37.5 to 45 MJ/kg.

7. A blended fuel for an internal combustion engine comprising:
- a fuel selected from the group consisting of: diesel, biodiesel, biofuel, Fischer-Tropsch fuel, marine fuel, or combinations thereof; and
- a fatty alkyl ether having a formula corresponding to formula (II):

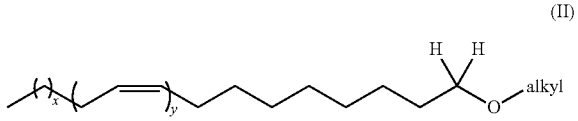

(II)

wherein x is 3 to 8, and y is 0 to 3; and
wherein the alkyl group is a C8 to C15 alkyl group.

8. The blended fuel of claim 7, wherein the fatty alkyl ether is present in a ratio of 99.9:0.1 to 51:49 by volume to the fuel.

9. The blended fuel of claim 7, wherein the fuel is present in a ratio of 99.9:0.1 to 51:49 by volume to the fatty alkyl ether.

10. The blended fuel of claim 7, wherein the fuel is selected from the group consisting of diesel, biofuel, biodiesel or a combination of these.

11. The blended fuel of claim 7, wherein an effective of amount of the fatty alkyl ether is present to raise a derived cetane number of the blended fuel 5% to 80% higher than the fuel alone.

12. A method for powering an internal combustion engine, comprising:
- combusting a fuel to drive a piston in a cylinder of the engine;
- wherein the fuel comprises a fatty alkyl ether having a formula corresponding to formula

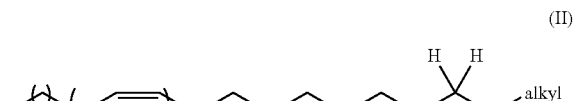

(II)

wherein x is 1-8, and y is 0 to 3; and
the alkyl is an alkyl group having a number of carbon atoms that is less than the number of carbon atoms in the alkyl chain on the opposite side of the oxygen atom;
wherein a ratio of the fatty alkyl ether to the fuel is 99.9:0.1 to 51:49 by volume.

13. The method of claim 12, further comprising a fuel selected from the group consisting of: diesel, biodiesel, marine fuel, biofuel, Fischer-Tropsch fuel, or combinations thereof.

14. The method of claim 12, wherein the engine is a compression ignition engine.

15. The method of claim 12, wherein the engine is a homogenous charge combustion ignition engine.

16. The method of claim 12, wherein the fuel is selected from the group consisting of diesel, biofuel, biodiesel, or a combination of these.

17. The fuel of claim 2, wherein x is 3 to 8.

18. The blended fuel of claim 7, wherein the alkyl is a branched alkyl group.

19. The blended fuel of claim 7, wherein the alkyl group is selected from the group consisting of: $CH_2CH(CH_3)_2$, $CH_2CH(CH_3)(CH_2CH_3)$, and $CH_2CH_2CH(CH_3)_2$.

20. The blended fuel of claim 7, wherein the blended fuel consists essentially of the fatty alkyl ether and a diesel fuel.

* * * * *